United States Patent [19]
Hutter

[11] Patent Number: 6,148,533
[45] Date of Patent: *Nov. 21, 2000

[54] SEGMENTED MECHANICAL SHAFTING ALIGNMENT TOOL AND METHOD

[76] Inventor: Edward F. Hutter, 4052 Jersey Ct., Naperville, Ill. 60564

[ * ] Notice: This patent is subject to a terminal disclaimer.

[21] Appl. No.: 09/271,221

[22] Filed: Mar. 17, 1999

Related U.S. Application Data

[63] Continuation of application No. 08/880,237, Jun. 23, 1997, Pat. No. 5,920,999.
[60] Provisional application No. 60/029,907, Oct. 31, 1996, and provisional application No. 60/021,091, Jul. 2, 1996.

[51] Int. Cl.[7] .................................................. G01B 5/25
[52] U.S. Cl. ..................... 33/645; 33/533; 33/529; 33/412
[58] Field of Search .................. 33/645, 533, 520, 33/529, 613, 412

[56] References Cited

U.S. PATENT DOCUMENTS

| | | | |
|---|---|---|---|
| 2,638,676 | 5/1953 | Callahan | 33/645 |
| 5,590,474 | 1/1997 | Lamb | 33/645 |
| 5,799,408 | 9/1998 | Sprayberry | 33/645 |
| 5,920,999 | 7/1999 | Hutter | 33/645 |

*Primary Examiner*—Christopher W. Fulton
*Attorney, Agent, or Firm*—Joseph M. Konieczny; John F. A. Earley; Harding, Earley, Follmer & Frailey

[57] ABSTRACT

A tool and method for aligning multiple shaft segments which are coupled together to form a single rotating shaft. The device comprises a cylindrical bar having an annular, axially-extending outer surface, rotating means on a first end of the bar, and engaging/disengaging means fixed on the second end of the bar. The bar is temporarily inserted through a bolt hole in the collar of the first shaft and partially through an aligned hole in an adjacent coupling of the second shaft until at least a portion of the engaging/disengaging means is positioned within the bolt hole of the second collar. The engaging/disengaging means engages the second collar so that a turning force from the first shaft is transmitted to the second shaft. The engaging/disengaging means also disengages from the second collar by rotating the bar after rotation of the shaft is ceased.

10 Claims, 8 Drawing Sheets

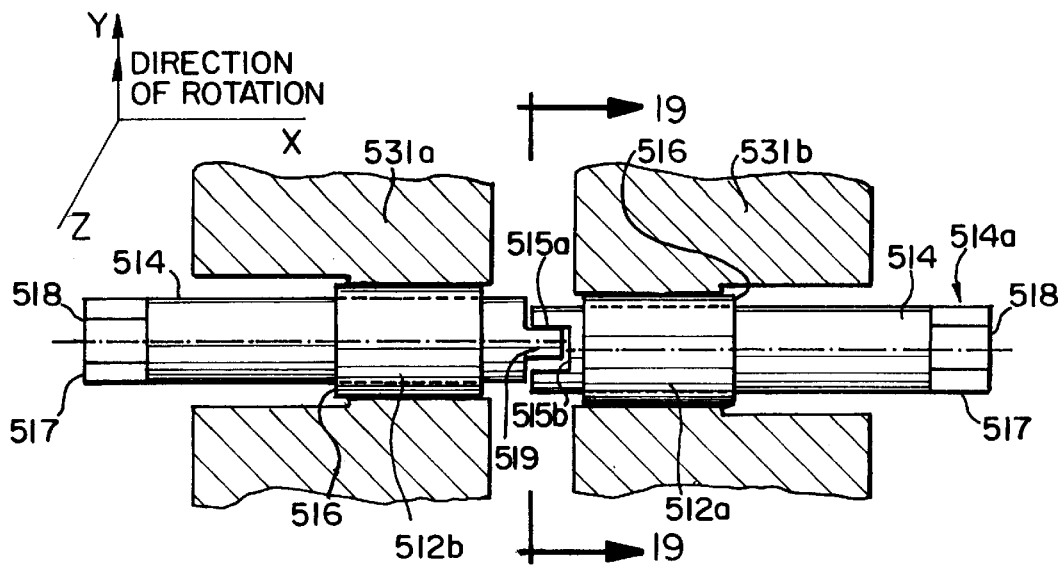
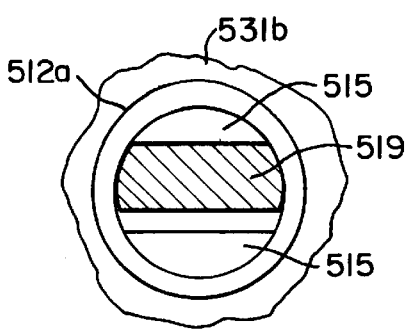
FIG.19
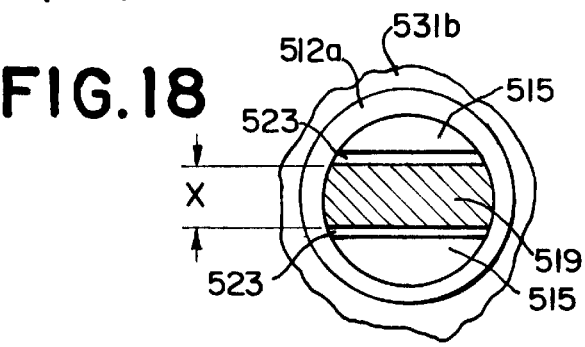
FIG. 21
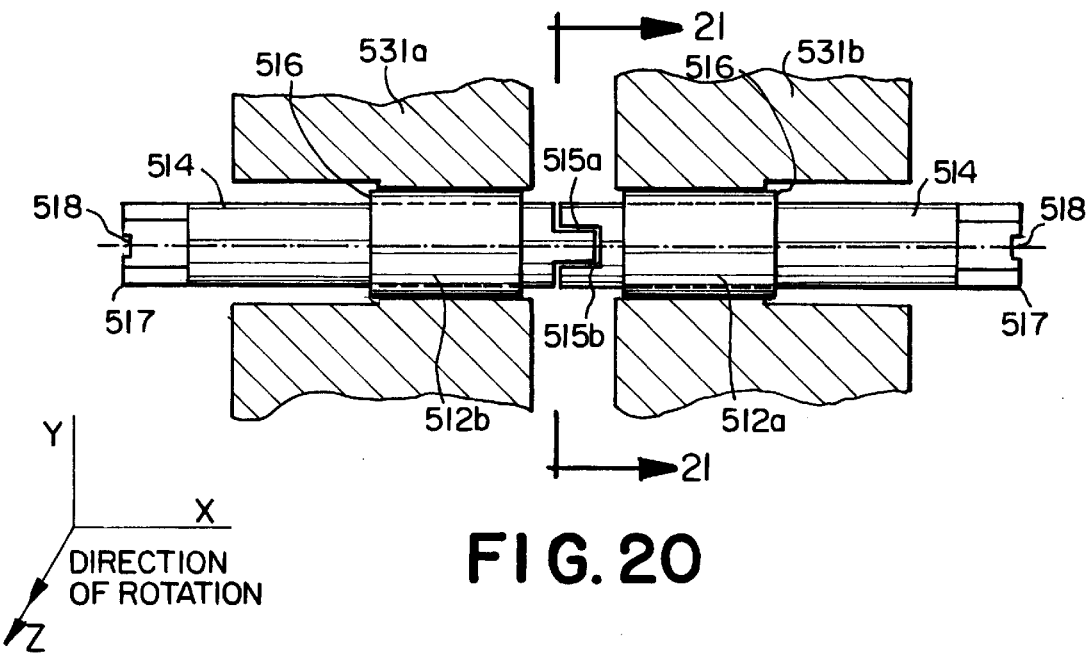
FIG. 20

SEGMENTED MECHANICAL SHAFTING ALIGNMENT TOOL AND METHOD

This application is a continuation of application Ser. No. 08/880,237 filed Jun. 23, 1997 now U.S. Pat. No. 5,920,999 which claims the benefit of U.S. Provisional Application No. 60/029,907 filed Oct. 31, 1996, and U.S. Provisional Application No. 60/021,091 filed Jul. 2, 1996.

FIELD OF THE INVENTION

The present invention relates to a tool for aligning segmented mechanical shafting, such as steam turbines, during initial-installation, coupling alignment checks and other maintenance work.

BACKGROUND OF THE INVENTION

The typical steam turbine-generator consists of multiple shaft segments having coupling collars which are coupled together to form a single rotating shaft. During turbine outages, maintenance personnel uncouple and remove one or more shaft segments for inspection. After uncoupling and prior to removal, the alignment of each turbine shaft segment is measured. During reassembly, the alignment between couplings is once again measured and compared to the original measurement or manufacturer's specifications to ensure that the shaft will be properly aligned. If alignment corrections are necessary, additional alignment measurements follow after each correction is made.

Shaft alignment measurements, more familiarly referred to as "coupling alignment checks", are a standardized sequence of rotational steps measuring the parallel and angular misalignment between two couplings. These steps include: temporarily connecting a pair of adjacent shaft segments; turning the pair of shaft segments several times to remove sag; rotating the shaft segments in 90 degree intervals; stopping after each interval to take a reading; and repeating the 90 turning process until a minimum of two full rotations is achieved. In total, for one alignment check, a minimum of 8 starts and stops is required to complete two rotations of the shafts.

Each shaft segment is very large and may weight up to 320,000 pounds. In order to connect and rotate the large shafts, barstock is inserted through aligned bolt holes of adjacent couplings and a turning force is applied by, for example, an overhead crane. The barstock temporarily connects the couplings during the rotation phase so that the turning force applied to one shaft segment is transmitted to the adjacent shaft segment. After each 90 degree rotation, the shaft segments must be disconnected to conduct an alignment check.

To disconnect the shaft segments, rotation is stopped and the barstock removed. Since the shafts are extremely heavy, the barstock typically binds in the bolt holes due to distortion (bending) of the barstock during rotation. Removing the barstock to make an alignment check is inhibited since this "torqued" condition remains in the bent barstock even when the turning force is removed. In order to relieve this "torqued" condition, the barstock must be loosened within the clearance of its hole. Loosening the barstock is extremely difficult and requires that one of the shaft segments be rotated in a reverse direction relative to the other.

Currently, several methods exist for applying the turning force required during coupling alignment checks. The most commonly used method is the combined use of a crane, a lifting cable, and round pin. The round pin is inserted halfway into one of the empty coupling bolt holes and the crane cable is looped over the free end of the round pin. The shaft or shaft(s) are then rotated a small amount by pulling the pin upward with the crane. Full rotation is achieved by relocating the pin in different bolt holes around the circumference of the shaft collar and pulling with the crane. This process is normally used for turning one shaft individually or, when used in conjunction with the aforementioned barstock connection, can be used to turn two shafts at the same time. However, as more shaft units are connected using barstock and turned in this manner, the load capacity of a single crane is challenged. As a result, a second pin and overhead crane must be used in conjunction with the first. This situation is undesirable since a complete alignment check may typically take up to 8 hours to perform, during which time two maintenance cranes are occupied.

As an alternative to using maintenance cranes, the already existing manufacturer-supplied turning gear may be used to provide the necessary turning force. The turning gear consists of a motor, speed reducer, and a large drive gear permanently attached to one of the shafts. During coupling checks, when barstock is inserted into any unbolted couplings, the turning gear will drive all the shaft segments at a very slow speed. Using the turning gear eliminates the need to use maintenance cranes; however, the turning gear does not alleviate the barstock binding problems described above.

Therefore, it would be desirable to provide an alignment tool which is constructed to temporarily connect, and quickly and easily disconnect adjacent shaft segments without becoming bound in the coupling bolt holes.

With the recent introduction of laser alignment technology, it has became absolutely necessary to maintain the clock position of the two couplings halves within seconds of arc. The barstock connection method cannot maintain the tight clocking relationship required of lasers due to the angular slippage between the couplings which occurs due to barstock bending.

Therefore, it would also be desirable to provide an alignment tool which maintains the relative angular position between the two shaft segments during the rotation phase of an alignment check.

When the large shaft segments are bolted together during initial assembly, it is often found that the axes of the shaft segments are not concentric. If the axes are not concentric, one shaft segment will "wobble" in relationship to the other during rotation causing turbine shaft vibration. To minimize turbine shaft vibration, the coupling collars should be bolted together as concentric as possible. This task, however, is not easy due to the extreme weight and size of each shaft segment.

In the prior art, adjusting coupling collar concentricity usually requires numerous hours of trial and error adjustments to the concentric (axial) alignment by loosening the connection bolts, hydraulically jacking one shaft segment relative to another, and then tightening the connection bolts. This is an inefficient and strenuous technique.

Another known method of correcting coupling concentricity involves jacking screw arrangements made to fit on the periphery of the coupling collars. While this technique is more efficient than the trial-by-error technique described above, it is also strenuous and time consuming, and requires expensive and bulky specialized tooling.

Therefore it would be desirable to provide an alignment tool which jacks one shaft segment relative to the other to achieve coupling collar concentricity in the shaft.

SUMMARY OF THE INVENTION

It is an object of the present invention to provide an alignment tool which is constructed to temporarily connect together two adjacent shaft segments during coupling alignment rotation, and which is constructed to quickly disconnect the shaft segments after each rotation phase of the coupling alignment check.

It is a further object of the present invention to provide an alignment tool which maintains the relative angular position constant between the two shaft segments during the rotation phase of an alignment check so that shaft alignment data can be collected using laser alignment equipment.

It is an additional object of the present invention to provide an alignment tool which may be employed simultaneously at each coupling location on a turbine shaft.

It is a further object of the present invention to provide an alignment tool constructed to adjust the coupling collar concentricity of adjacent shaft segments during assembly.

These and other objects are accomplished by providing an inventive coupling pin device and method of using it which allows two or more in-line shafts to be temporarily coupled together and rotated as a unit. In addition, the device also allows the same shafts to be quickly disconnected, with no residual turning stress, after turning is ceased.

The tool for aligning multiple shaft segments comprises a two-piece pin assembly which is temporarily inserted through aligned bolt holes in the couplings of the adjacent shaft segments. The pin assembly comprises a pair of elongate, cylindrical bars. Each bar has an annular, axially extending outer surface, first and second end surfaces, a notch formed in the first end of the bar, and means on the second end of the bar for rotating the bar. The notches are constructed and arranged to cooperatively engage with one another so that a turning force from one bar is transmitted to the other bar. The notches are also constructed and arranged to disengage from one another when the bars are rotated.

The notches have an axial notch surface extending axially a distance "Y" along a plane defined by a chord on the first end surface. The chord is shorter than the diameter of the bar.

The notches also have a radial notch surface extending radially outwardly a distance "X" from the axial inner end of the axial notch surface. The distance "X" is greater than the radius of the bar when measured along a line extending perpendicular to the axial notch surface from the midpoint of the chord to the outer surface of the bar. Preferably, the distance "X" is equal to about ½ of the bar diameter plus 1/16 inch.

The bars are constructed and arranged to disengage when the bars are rotated 90 degrees from an engaged position.

The rotating means comprises a lug fixed to the second end surface of the bar. The lug has multiple flat surfaces which are constructed and arranged to receive a wrench or socket for applying a turning force. The lug may have a square, hexagonal or twelve-point shape. The rotating means may also comprise recessed hex socket or pin hole sockets which cooperate with a hex or pin wrench. The rotating means may also include a linear notch indicator for indicating the angular orientation of the notch.

The pin assembly preferably includes a sleeve fixed to the outer surface of the bars proximate the notch. The sleeve is shorter than the axial distance from the notch to the rotating means.

The pin assembly may include adjustable extensions fixed to and extending perpendicular from the axial notch surface on one of the bars. The extensions may comprise set screws extending from threaded bores in the axial notch surface, or the extensions may comprise shims removably secured to the axial notch surface.

The pin assembly may also include a second sleeve fixed to the outer surface of the first sleeve proximate the rotating means. Preferably, the second sleeve has a frusto-conical outer surface profile.

In another embodiment of the invention, a coupling runout eliminator (CRE) pin assembly comprises a pair of elongate, cylindrical bars. Each bar comprises an annular, axially-extending outer surface, first and second end surfaces, and a notch formed in the first end of the bar. The notch is defined by a radial notch surface and a fully or partially tapered, axial notch surface.

The pin assembly includes means on the second end of at least one bar for rotating the bar and means for temporarily connecting the bars with the tapered, axial notch surfaces overlapping, and means for adjusting the axial location of overlap of the notch surfaces by axially moving the bars relative to one another.

The bars are constructed and arranged to cooperatively engage with overlapping tapered surfaces and jack one shaft segment relative to an adjacent shaft segment when the axial location of overlap of the notches is adjusted.

The axial notch surface is preferably a full or partially inclined plane extending axially and radially outwardly. The plane is defined by a chord on the first end surface. The chord is shorter than the diameter of the bar.

The radial notch surface extends radially outwardly from the inner end of the axial notch surface to the outer annular outer surface. The radial notch surface extends radially outwardly a distance "X" from the axial inner end of the axial notch surface. On the bar having the partially-tapered, axial notch surface, the axial notch surface comprises a flat plane portion extending parallel to the longitudinal axis of said bar and an inclined portion extending axially and radially outwardly from the flat plane portion. The distance "X" is greater than the radius of the bar when measured along a line extending perpendicularly from the flat plane portion to the outer annular surface of the bar. Preferably, the distance "X" is equal to the radius of the bar plus ¼–5/16 inches. On the bar having the fully-tapered, axial notch surface, the distance "X" is less than the radius of the bar when measured along a line extending perpendicularly from the axial notch surface to the outer annular surface of the bar.

The temporary connecting means comprises a cylindrical bore extending through one bar from the radial notch surface to the other end surface, a cylindrical threaded bore in the other bar extending from the first end surface longitudinally to a point intermediate the bar, and a bolt extending through the cylindrical bore and into the threaded bore.

The pin assembly may include a linear notch indicator on the rotating means for indicating the angular orientation of the notch.

The pin assembly also includes a sleeve fixed to the outer surface of the bars proximate the notch. The sleeve is shorter than the axial distance from the notch to the rotating means.

The pin assembly may also include adjustable extensions fixed to and extending perpendicularly from the axial notch surface of one of the bars. The extensions may comprise shims removably secured to the axial notch surface.

In a further embodiment, one bar has a notch formed in the first end of the bar and the other bar has a tab formed in the first end of the bar. The tab and notch are constructed and arranged to cooperatively engage so that a turning force from one bar is transmitted to the other bar. The tab and notch are also constructed and arranged to disengage from one another so that the shaft segments can rotate independent of the one another. In this embodiment, the tab and notch are constructed to engage when one shaft segment is rotated in either the clockwise or counterclockwise direction.

In an additional embodiment, the pin assembly comprises two elongate cylindrical bars. The first elongate, cylindrical bar has an annular, axially extending outer surface; means on one end of the bar for rotating the bar within one of the aligned apertures; and means on the other end of the bar for engaging with and disengaging from the second bar.

The second elongate, cylindrical bar has an annular, axially extending outer surface; means on one end of the bar for engaging with and disengaging from the first bar; and a threaded, annular, axially-extending internal bore. The engagement means is constructed and arranged so that a rotational force is transmitted from one bar to the other bar. The disengagement means is constructed and arranged so that the bars are disengaged when the bars are rotated 90 degrees from an engaged position.

The present invention also provides a method of aligning multiple shaft segments which are coupled together to form a single rotating shaft. The method comprises the steps of first inserting a two-piece pin assembly through aligned apertures in the couplings of adjacent shaft segments. The pin assembly may be of the type described above. Next, the couplings are temporarily connected by orienting the pin assemblies such that the notch faces are in contact with one another and the couplings rotate together as a unit.

The shaft segments are then rotated to remove sag in the shaft segments. Then, the couplings are disengaged by rotating the pin assemblies 90 degrees within the bolt holes. After the couplings are disengaged, the coupling alignment is measured. Preferably, the pin assemblies are rotated by applying a torquing tool to the rotating means.

The present invention also provides a method of adjusting the clock position of the couplings by adjusting the distance between the overlapping axial notch surfaces by providing adjustable extensions fixed to and extending perpendicular to the axial notch surface on one of the bars.

The present invention also provides a method of correcting coupling collar concentricity of multiple shaft segments which are coupled together to form a single rotating shaft. The method comprises the steps of first disconnecting the shaft segments and inserting temporary bolts (bolts with sufficient clearance to make adjustments) into spaced bolt hole locations in the couplings and slightly tightening the temporary bolts. The clock position of the couplings can then be aligned as needed by installing and adjusting two CRE pin assemblies (described above) in adjacent bolt holes. After the clock position of the couplings is aligned, the temporary bolts are firmly tightened and the two CRE pin assemblies are removed.

Next, the position of maximum positive differential coupling runout (DCR) is located and marked. A CRE pin assembly is inserted at the location of maximum DCR and at locations 90 degrees from that position. The temporary bolts are then loosened. The measured DCR is corrected by adjusting the CRE pin assemblies.

The step of aligning the clock position includes the steps of orienting the axial notch faces of the CRE pin assemblies such that the length of the notch corner is parallel to a radial line extending from the center of the coupling through the center of the bolt hole in which the CRE pin assemblies is installed, and rotating the adjustment means on each CRE pin assembly.

The step of inserting a CRE pin assembly at the location of maximum DCR and at locations 90 degrees from that position includes orienting the CRE pin assemblies such that the length of the notch corner is perpendicular to a radial line extending from the center of the coupling through the center of the bolt hole in which the CRE pin assembly is installed.

BRIEF DESCRIPTION OF THE DRAWINGS

FIG. 18 is a side elevational view of two recessed bolt circle type couplings connected by a pin assembly of yet a further embodiment of the invention;

FIG. 19 is a cross-sectional view taken along line 19—19 of FIG. 18;

FIG. 20 is a side elevational view of two recessed bolt circle type couplings (shown in cross section) disconnected by the pin assembly of FIG. 18;

FIG. 21 is a cross-sectional view taken along line 21—21 of FIG. 20;

DETAILED DESCRIPTION OF A PREFERRED EMBODIMENT

For the purpose of illustration, preferred embodiments of the claimed invention are shown in FIGS. 1–26 wherein like numerals are used to designate like parts throughout the drawings.

Figure 1:
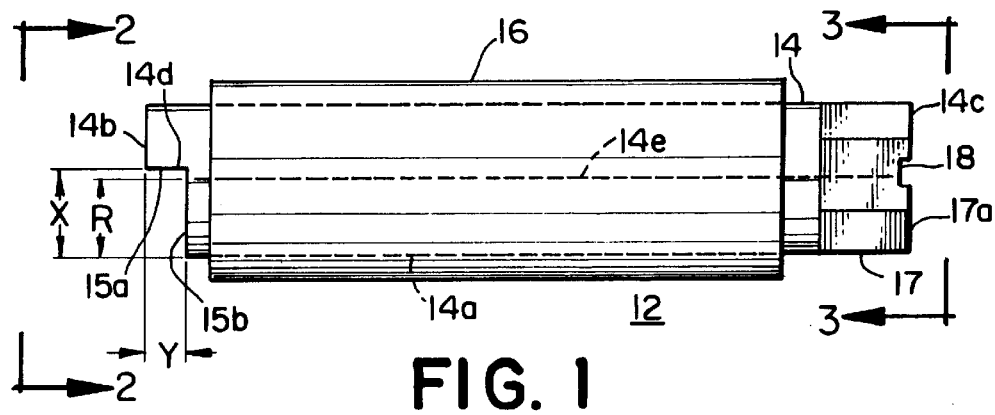
FIG. 1 is a side elevational view of a pin assembly according to an embodiment of the invention.
Figure 2:
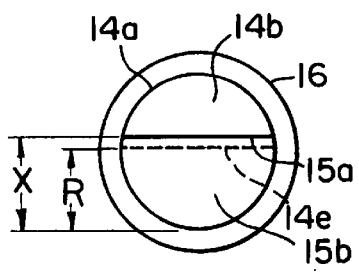
FIG. 2 is an end view taken along line 2—2 of FIG. 1.
Figure 3:
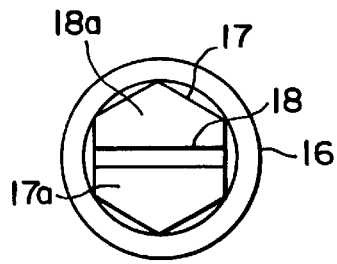
FIG. 3 is an end view taken along line 3—3 of FIG. 1.

In a first embodiment of the invention, the coupling pin device comprises a pair of cooperating pin assemblies 12 which are inserted through aligned bolt holes of adjacent coupling collars. One pin assembly 12 is shown in FIGS. 1–3. The pin assembly 12 comprises a steel bar 14 and a bronze, brass, or other soft metal sleeve 16 heated and shrunk fit over the annular, axially extending outer surface 14a of the bar 14 so as to join the bar 14 and sleeve 16 together.

The bar 14 has two end surfaces 14b, 14c. A notch, designated generally as reference numeral 15, is formed in the notch end 14b of the bar 14. The notch. 15 is defined by an axial notch surface 15a and a radial notch surface 15b.

Referring to FIGS. 1 and 2, the axial notch surface 15a is formed, preferably by machining, longitudinally into the bar from the notch end surface 14b of the bar 14. The axial notch surface 15a extends longitudinally a distance "Y", preferably about 1 inch nominal, and forms a planar surface parallel to the longitudinal axis 14e of the bar 14.

The radial notch surface 15b is formed, preferably by machining, radially into the bar from the outer annular surface 14a of the bar 14 and intersects the axial notch surface 15a, thereby forming the notch 15. The radial notch surface extends radially a distance "X" from the axial notch surface 15a to the outer surface 14a. The radial notch surface extends transversely, and preferably perpendicularly, to the axial notch surface 15a and the longitudinal axis 14e of the bar 14. The distance "X" must be greater than the radius "R" of the bar, and is preferably equal to the radius of the bar 14 plus an additional one-sixteenth of an inch nominal.

Nominal dimensions are given to illustrate general sizing of the notch 15. The most critical dimension of the notch 15 is the dimension "X", which must be greater than the radius of the bar 14, and is preferably equal to the radius "R" of the bar plus one-sixteenth of an inch nominal. This locates the corner 14d of the notch above the longitudinal axis 14e. The corner 14d is also machined to a one-sixteenth of an inch nominal radius. As shown later in FIGS. 7, 8, and 9, the geometry of the notch 15 enables the pin assemblies 12 to disconnect from one another under load when rotated 90 degrees.

The notch end 14b of the bar 14 is shown in detail in FIG. 2 wherein the axial notch surface 15a is projected as a line which subtends the circumference of the annular outer surface 14a of the bar 14 nominally about one-sixteenth of an inch above the bar diameter 14e. The notch end surface 14b is smaller than a full semi-circle of the bar, and comprises a shape bounded by the outer edge of the axial notch surface 15a and an arc of the outer annular surface 14a of the bar 14.

A drive head 17 is formed, preferably by machining, on the drive end 14c of the bar 14 so that the bar 14 can be rotated with a standard wrench (not shown). Referring to FIGS. 1 and 3, the drive head 17 is depicted as a hex head in a preferred embodiment, but may be a square-end head, twelve-point head, or any other geometric shape head which facilitates easy turning by a standard wrench, socket wrench, or other torquing tool.

A notch locator slot 18 is formed in the end surface 17a of the hex drive 17. The notch locator slot 18 preferably comprises a linear groove machined parallel to the axial notch surface 15a. The notch locator slot 18 is used as an easy reference to determine the angular orientation of the axial notch surface 15a. To also aid referencing the angular orientation of the axial notch surface 15a and the notch end surface 14b, paint 18a may be applied to one half of the drive head end surface 17a corresponding to the notch end surface.

Referring to FIG. 3, the notch locator slot 18 is shown traversing the hexagonal-shaped drive head 17. Paint 18a (illustrated by cross hatching) is applied to one half of the drive head end surface 17a to help indicate the angular orientation of the axial notch surface 15a and notch end surface 14b.

Figure 4:
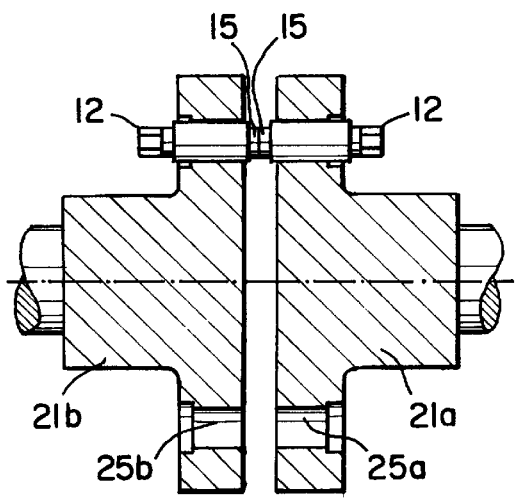
FIG. 4 is a side elevational view of two standard flat flanged type couplings (shown in cross section) connected during rotation by the pin assembly of an embodiment of the invention.
Figure 5:
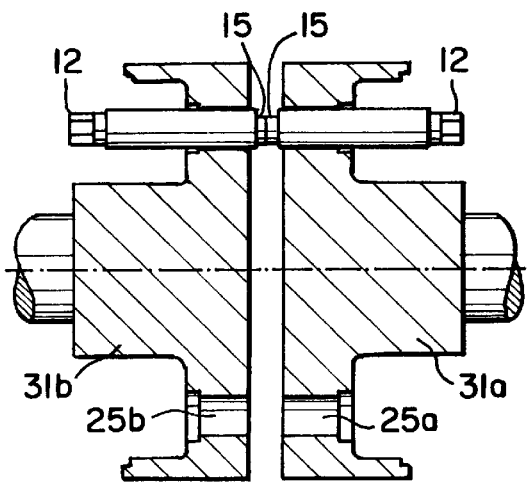
FIG. 5 is a side elevational view of two recessed bolt circle type couplings (shown in cross section) connected during rotation by the pin assembly of an embodiment of the invention.
Figure 6:
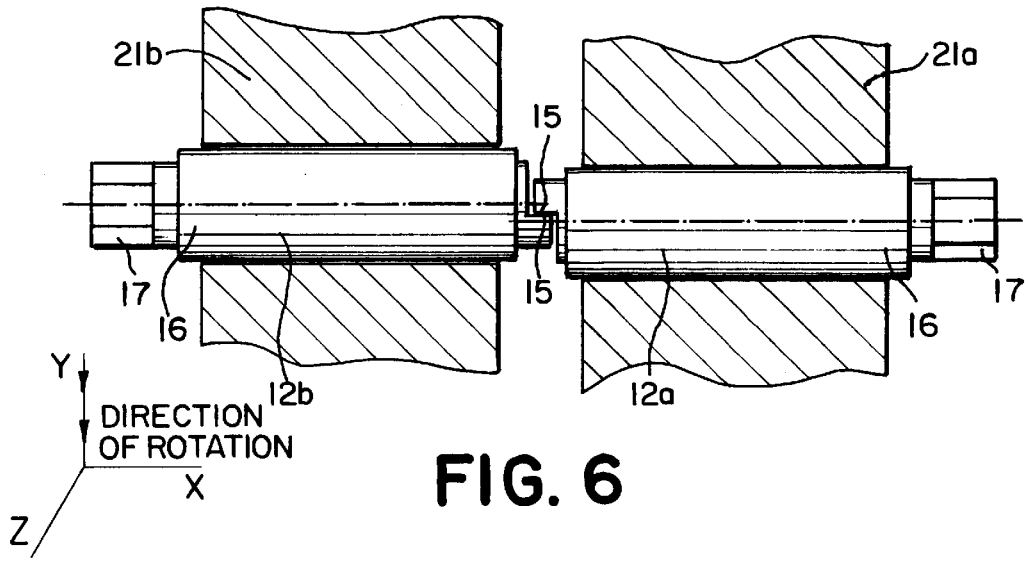
FIG. 6 is an enlarged, side elevational view of a pin assembly in the engaged position during rotation of two couplings (shown in cross section)

A pair of pin assemblies 12 are shown in cooperating engagement with one another to connect during rotation two standard flat flange type couplings 21a and 21b in FIG. 4, and two recessed bolt circle type couplings 31a and 31b in FIG. 5. As seen in greater detail in FIG. 6, the connection is provided by inserting one pin assembly into each of a pair of aligned, opposed coupling bolt holes 25a, 25b until the notches 15 overlap. As the first coupling 21a is rotated in the "Y" direction shown in FIG. 6, the notch from the pin assembly 12a in the first coupling 21a contacts the notch on the second pin assembly 12b, thereby causing the couplings 21a and 21b to rotate together as a unit.

Figures 7, 8:
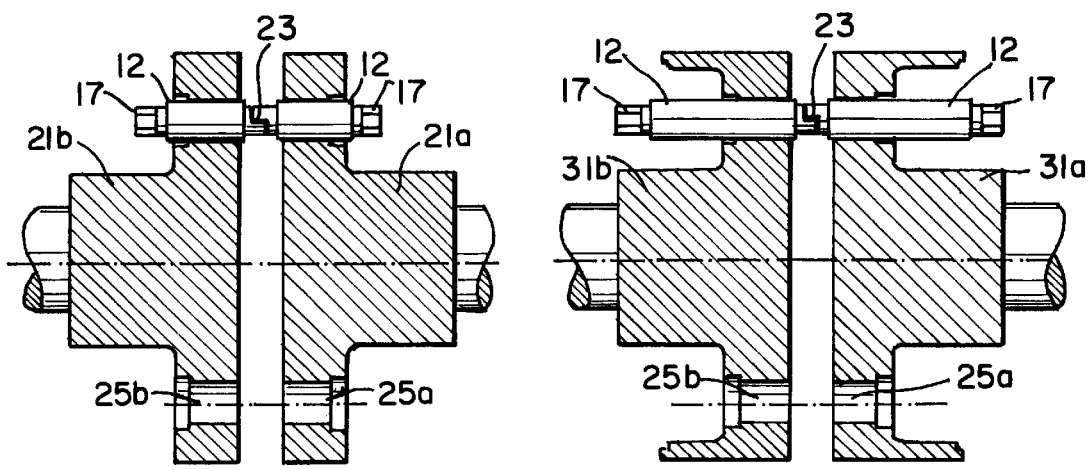
FIG. 7 is a side elevational view of two standard flat flanged type couplings (shown in cross section) disconnected by the pin assembly of an embodiment of the invention.
FIG. 8 is a side elevational view of two recessed bolt circle type couplings (shown in cross section) disconnected by the pin assembly of an embodiment of the invention.
Figure 9:
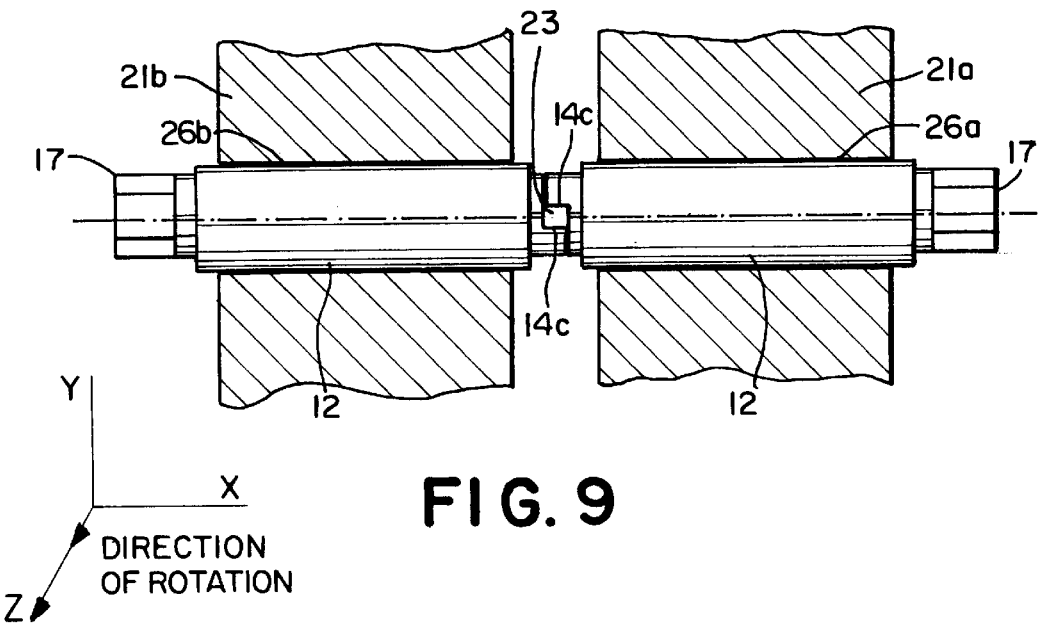
FIG. 9 is an enlarged, (shown in cross section) view of a pin assembly in the disengaged position during an alignment measurement of two couplings (shown in cross section)

A pair of pin assemblies 12 are shown disengaged, for example at the end of the rotation phase of a coupling alignment check, on two standard flat flange type couplings 21a and 21b in FIG. 7, and two recessed bolt circle type couplings 31a and 31b in FIG. 8. As seen in greater detail in FIG. 9, the couplings are disconnected by rotating each pin assembly 90 degrees within the bolt holes 25a, 25b, thereby causing the previously engaged axial notch surfaces 15a to be separated by a disengagement gap 23 and change their angular orientation relative to the direction of rotation of the couplings. In FIG. 9, the direction of rotation of the couplings is in the "Z" direction or perpendicular to the plane of the drawing sheet.

The pin assemblies 12 are rotated by applying a wrench or other torquing tool to the drive head 17 and simultaneously rotating both pin assemblies 90 degrees. The pin assemblies may be turned either clockwise or counterclockwise so long as both pins are turned in the same direction. The pin assemblies 12 can be turned very easily since turning resistance is minimal due to the slip fit of the bronze sleeve 16 and the bolt hole 25 inner surface which act together like a shaft and a bearing.

The disengagement notch gap 23 results from the fact that the depth "X" of the radial notch surfaces 15b (shown in FIGS. 1 and 2) of each of the mating pins assemblies is greater than the bar radius "R", preferably equal to the bar radius "R" plus one-sixteenth of an inch nominal, and because the coupling bolt holes have bolt circles diameters that are nearly concentric.

Figure 10:
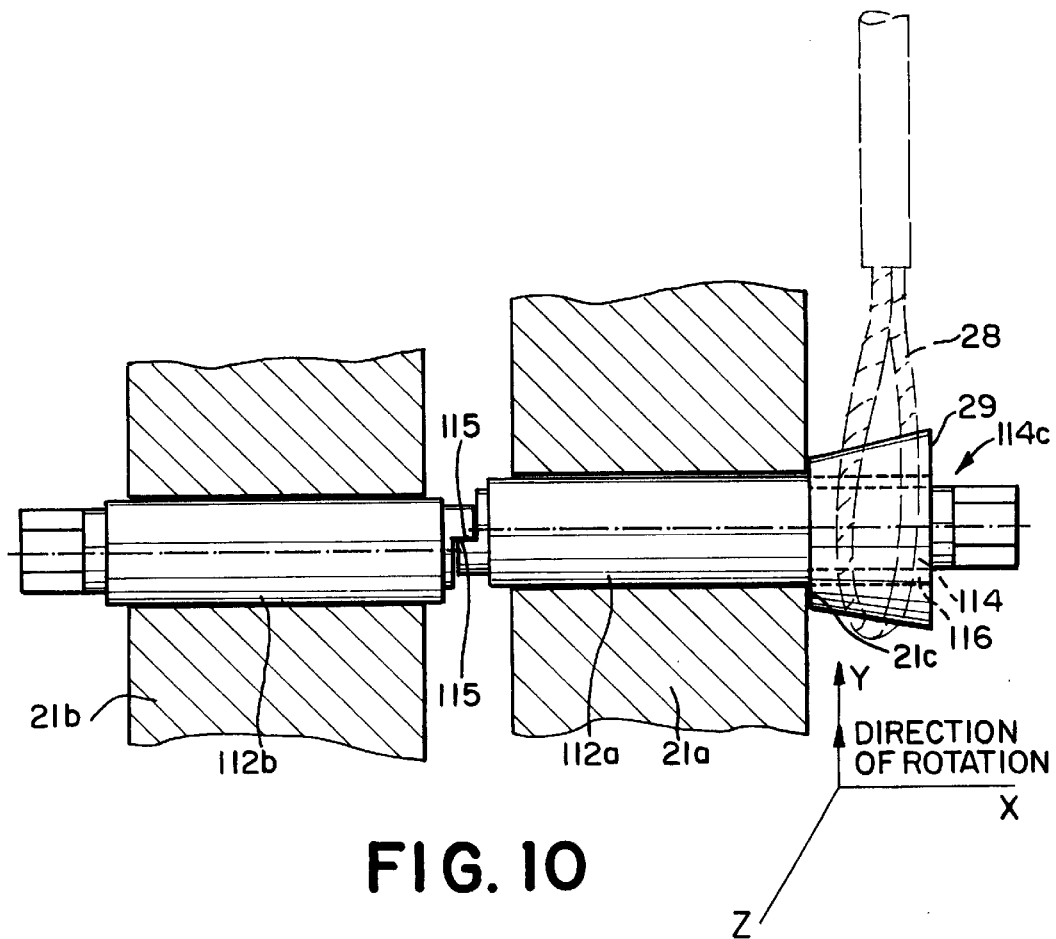
FIG. 10 is a side elevational view of a further embodiment of the invention showing a pin assembly in the engaged position during rotation of two couplings (shown in cross section) by a crane cable (shown in phantom)

In a second embodiment of the invention, the coupling pin device comprises a pair of cooperating pin assemblies 112 as illustrated in FIG. 10. The pin assemblies 112a and 112b have the same construction as the pin assemblies 12a and 12b of the first embodiment except that one pin assembly 112a is longer than the mating pin assembly 112b and includes a second sleeve 29 which is constructed to slide over the drive end 114 of the first sleeve 116 of the long pin assembly 112a. The second sleeve 29 has an annular outer surface which is tapered along the length of the sleeve 29 thereby forming a frusto-conical outer surface profile.

In this embodiment, the extra length of the long pin assembly 112a projects beyond the back face 21c of the coupling 21a, thereby providing a connection point for a crane cable 28 to be looped over the drive end 114c of the long pin assembly 112a. The second sleeve 29 is constructed to slide over the extended end of the long pin assembly 112a with the smaller, tapered end abutting the back face 21c of the coupling 21a. A crane cable 28 may be looped over the sleeve 29 and pulled upwardly to apply a turning force to the couplings. The couplings 21a and 21b will then rotate in the direction shown in FIG. 10.

Figure 11:
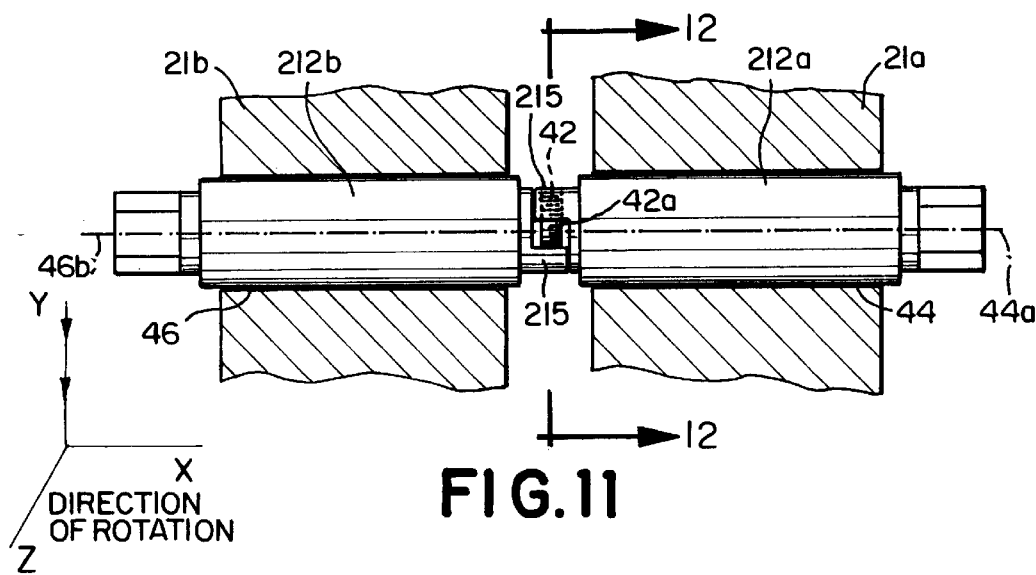
FIG. 11 is a side elevational view of another embodiment of the invention connecting two couplings (shown in cross section) including adjustment screws.
Figure 12:
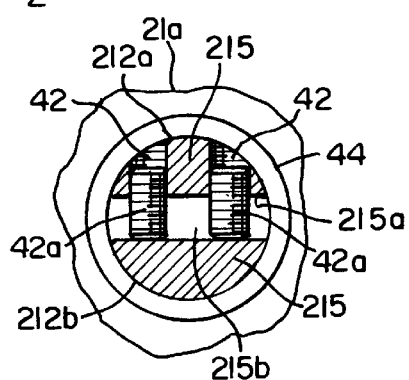
FIG. 12 is a sectional view taken along line 12—12 of FIG. 11.

A third embodiment of the coupling pin device of the present invention comprises a pair of cooperating pin assemblies 212 as illustrated in FIGS. 11 and 12. The pin assemblies 212a and 212b have the same construction as the pin assemblies 12 of the first embodiment except a pair of adjustment screws 42 are fixed to and protrude from the axial notch surface 215a of one of the pin assemblies 212a. Referring to FIG. 12, two adjustment screws 42 are screwed into threaded bores in the axial notch surface 215a of one of the pin assemblies 212a. A portion 42a of the adjustment screws 42 protrudes from the axial notch surface 215a and contacts the other axial notch surface 215b during rotation.

The adjustment screws 42 can be adjusted to change the length of the extension portion 42a of the screws 42 which protrudes from the axial notch surface 215a. As a result, the centerlines 44a and 46a of the mating bolt holes 44 and 46 will also be adjusted to the desired angular positions allowing bolting to be installed easier. Further, the angular position between the first pin assembly 212a and the mating pin 212b is adjusted by extension or retraction of the adjustment set screws 42.

Figure 14:
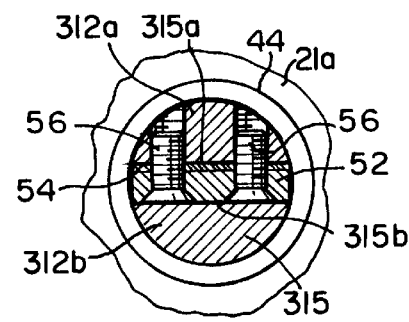
FIG. 14 is a sectional view taken along line 14—14 of FIG. 13.
Figure 13:
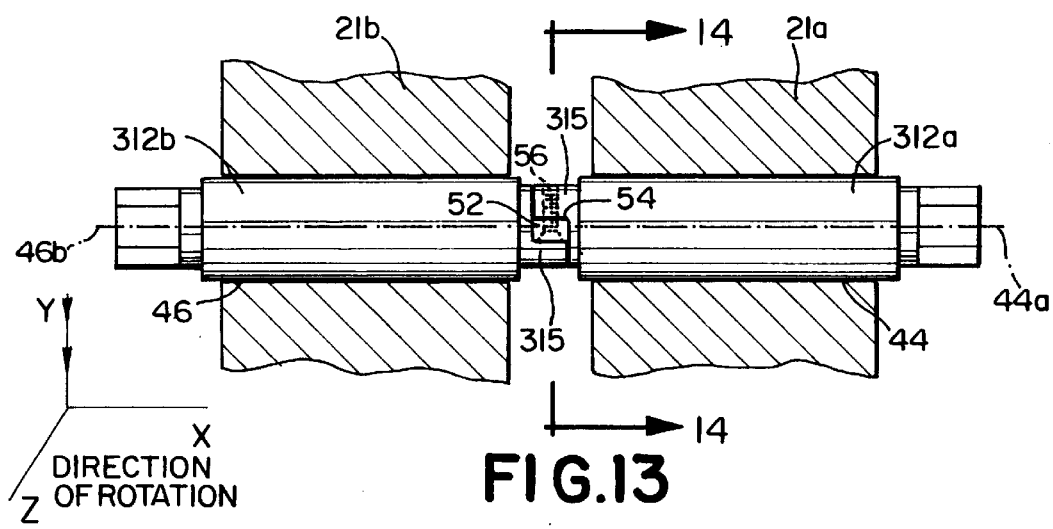
FIG. 13 is a side elevational view of a further embodiment the invention connecting two couplings (shown in cross section) adjustment shims.

A fourth embodiment of the coupling pin device of the present invention comprises a pair of cooperating pin assemblies 312a, 312b as illustrated in FIGS. 13 and 14. The pin assemblies 312a and 312b have the same construction as the pin assemblies 12 of the first embodiment except that one of the pin assemblies 312a includes a primary metal shim 52 with countersunk through holes, and secondary, thinner shims 54 behind the primary shim 52. The shims 52, 54 are attached to the axial notch surface 315a of one of the pin assemblies 312a. The shims 52, 54 protrude from the axial notch surface 315a of one pin assembly and contact the other notch surface 315b during rotation.

Referring to FIG. 14, the shims 52, 54 are attached to the axial notch surface by two flat head screws 56 which are screwed into threaded bores in the axial notch surface 315a. The distance which the primary shim protrudes can be adjusted by removing the flat head screws 56 and adding or subtracting the number of secondary shims 54 behind the primary shim 52. As a result, the centerline 44a and 46a of the mating bolt holes 44 and 46 will be adjusted to the desired angular position in the same manner as the embodiment described above with reference to FIGS. 11 and 12.

Figure 15:
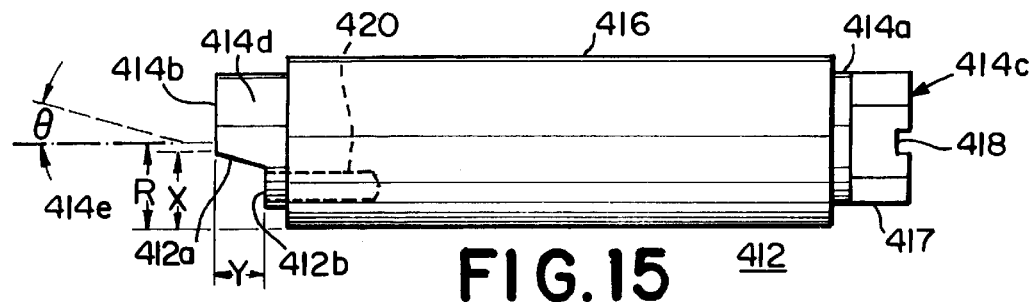
FIG. 15 is a side elevational view of the first half of a pin assembly of an additional embodiment of the invention.
Figure 16:
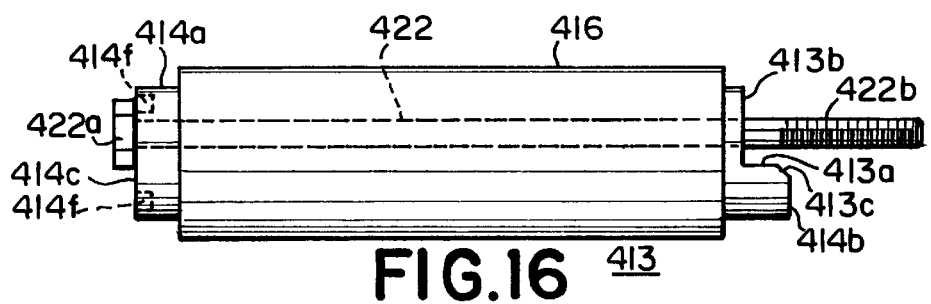
FIG. 16 is a side elevational view of the second half of a pin assembly of an additional embodiment of the invention.
Figure 17:
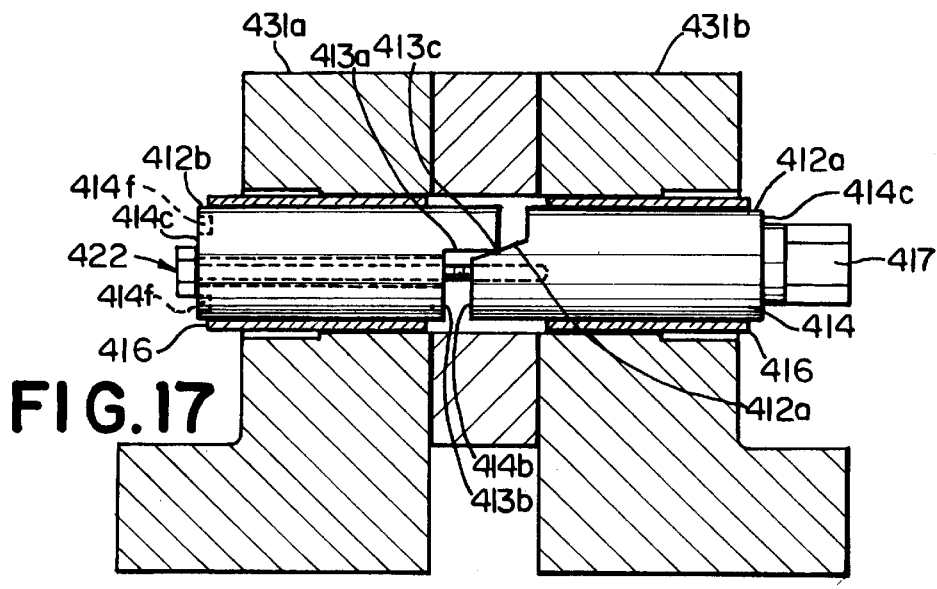
FIG. 17 is a side elevational view of two recessed bolt circle type couplings (shown in cross section) connected by the pin assembly of FIGS. 15 and 16.

A fifth embodiment of the coupling pin device of the present invention comprises a pair of cooperating pin assemblies 412 and 413 as illustrated in FIGS. 15–17. The pin assemblies 412 and 413 of this embodiment are constructed to "scissor" one shaft segment relative to another to adjust coupling collar concentricity or "coupling runout".

Each CRE pin assembly 412, 413 comprises of a steel bar 414 and a bronze, brass, or other soft metal sleeve 416 heated and shrunk fit over the annular, axially extending outer surface of the bar 414 so as to join the bar 414 and sleeve 416 together. Each bar 414 has a notch end surface 414b in which a notch is formed. The notch is defined by an axial notch surface and a radial notch surface.

Referring to FIG. 15, the tapered axial notch surface 412a of the first pin assembly 412 is formed, preferably by machining, longitudinally into the bar from the notch end surface 414b of the bar 414. The axial notch surface 412a extends longitudinally a distance "Y", preferably about 2 inches nominal, and radially outwardly at an angle theta e relative to the longitudinal axis 414e of the bar 414. Preferably, the angle theta $\Theta$ is about 2 degrees.

The radial notch surface 412b of the first pin assembly 412 is formed, preferably by machining, radially into the bar from the outer annular surface and intersects the tapered, axial notch surface 412a, thereby forming the notch. The radial notch surface extends radially a distance "X" from the axial notch surface 412a to the outer annular surface. The radial notch surface extends in a direction transverse to the axial surface 412a and the longitudinal axis 414e of the bar 414. The distance "X" is preferably less than the radius "R" of the bar, and is preferably equal to the radius of the bar 414 minus 9/32 inches.

Figure 16A:
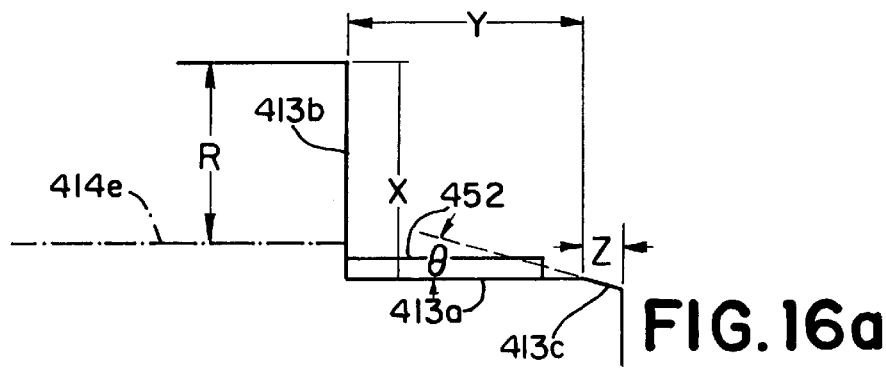
FIG. 16a is an enlarged, sectional, side elevational view of the notch surface of the bar shown in FIG. 16.

Referring to FIGS. 16 and 16a, the axial notch surface of the second pin assembly 413 comprises the combination of the flat axial notch surface 413a on the inner side of the notch and the relatively short outer tapered surface 413c. Both surfaces 413a and 413c are formed, preferably by machining, longitudinally into the bar from the notch end surface 414b of the bar 414. The inward axial notch surface 413a extends longitudinally a distance "Y", preferably about 1 15/16 inches nominal. The outer, tapered axial notch surface 413c extends longitudinally a distance "Z", preferably about 1/16 inches nominal, and radially outwardly at an angle theta $\Theta$ relative to the longitudinal axis 414e. Preferably, the angle theta $\Theta$ is about 2 degrees.

The radial notch surface 413b of the second pin assembly 413 is formed, preferably by machining, radially into the bar from the outer annular surface 414a and intersects the inner axial notch surface 413a, thereby forming the notch. The radial notch surface extends radially a distance "X" from the axial notch surface 413a to the outer annular surface. The radial notch surface 413b extends in a direction transverse to the inner axial surface 413a and the longitudinal axis of the bar 414e.

The distance "X" is preferably greater than the radius "R" of the bar, and is preferably equal to the radius of the bar 414 plus 1/4–5/16 inches.

The first CRE pin assembly 412 has a drive head 417 formed, preferably by machining, on the other end 414c of the bar 414 so that the cooperating pin assemblies 412, 413 can be rotated with a standard wrench (not shown). Referring to FIG. 15 and 17, the drive head 417 is depicted as a hex head in a preferred embodiment, but may be a square-end head, twelve-point head, or any other geometric shape head which facilitates easy turning via a standard wrench, socket wrench, or other torquing tool.

A notch locator slot 418 is formed in the end surface of the hex drive 417. The notch locator slot 418 preferably comprises a linear groove machined generally parallel to the axial notch surface 412*a*. The notch locator slot 418 is used as an easy reference to determine the angular orientation of the axial notch surface 412*a*. To also aid referencing the angular orientation of the axial notch surface 412*a*, paint may be applied to one half of the drive head end surface.

The first CRE pin assembly 412 further includes a threaded bore 420 extending longitudinally into the bar 414 from the radial notch surface 412*b*. The threaded bore 420 is designed to receive the threaded end 422*b* of a bolt 422, shown in FIG. 16, to temporarily connect the pin assemblies 412 and 413 with axial notch surfaces overlapping. The threaded bore 420 is preferably about 2 inches long and extends generally parallel to the longitudinal axis 414*e* of the bar 414 of the first pin assembly 412.

The second CRE pin assembly 413 includes a longitudinal bore and a threaded rod or bolt 422 inserted therethrough for temporarily connecting the pin assemblies 412 and 413. The bolt 422 has fine threads 422*b* on one end and a head 422*a* on the other. In FIG. 16, the head 422*a* is depicted as a hex head in a preferred embodiment, but may be a square-end head, twelve-point head, or any other geometric shape head which facilitates easy turning via a standard wrench, socket wrench, or other torquing tool.

The second CRE pin assembly 413 also has two holes 414*f* on end 414*c* to turn the bar of the second pin assembly 413. The drive holes 414*f* are formed, preferably by machining, on the drive end 414*c* of the bar 414 so that the bar can be rotated with a pin wrench (not shown).

A pair of CRE pin assemblies 412, 413 are shown in FIG. 17 in cooperating engagement with one another to correct the coupling concentricity of two standard flat flanged type couplings 431*a* and 431*b*. The connection between the two CRE pin assemblies 412, 413 is provided by inserting one pin assembly into each of a pair of aligned, opposed coupling bolt holes until the notches overlap. Then, the threaded bolt 422 is inserted through the bore in the second pin assembly 412*b* and screwed into the threaded bore of the first pin assembly 412*a*.

Once the CRE pin assemblies are connected, one coupling can be "scissored" relative to the other by adjusting the axial location of overlap of the notches. The axial location of overlap is adjusted by applying a turning force to the bolt head 422*a* which causes the bars to move axially relative to one another due to the bolt/threaded bore connection, and causing the bars to move radially relative to one another due to the tapered axial notch surface 412*a*. Using the pin assembly of the present invention, the coupling concentricity of the adjacent couplings can be precisely adjusted.

Referring to FIG. 16*a*, the pin assembly 413 may be include a metal shim 452 added to the axial notch surface 413*a* similar to the fourth embodiment. The shim 452 may be fixed to the axial notch surface 413*a* preferably by adhesive tape or by two flat head screws which are screwed into threaded bores in the axial notch surface 413*a*.

A sixth embodiment of the coupling pin device of the present invention comprises a pair of cooperating pin assemblies 512*a* and 512*b* as illustrated in FIGS. 18–21. Each pin assembly 512 comprises a steel bar 514 and a bronze, brass, or other soft metal sleeve 516 heated and shrunk fit over the annular, axially extending outer surface 514*a* of the bar 514 so as to join the bar 514 and sleeve 516 together.

Similar to the pin assemblies described above with reference to FIGS. 1–9, each bar 514 has a drive head 517 formed, preferably by machining, in the drive end 514*c* of the bar 514 so that the bar 514 can be rotated with a standard wrench (not shown). Referring to FIGS. 18 and 20, the drive head 517 is depicted as a hex head in a preferred embodiment, but may be a square-end head, twelve-point head, or any other geometric shape head which facilitates easy turning via a standard wrench, socket wrench, or other torquing tool.

A notch locator slot 518 may be formed in the end surface of the hex drive 517. The notch locator slot 518 preferably comprises a linear groove machined parallel to the axial notch surface 515*a*. The notch locator slot 518 is used as an easy reference to determine the angular orientation of the axial notch surface 515*a*. To also aid referencing the angular orientation of the axial notch surfaces 515*a*, paint may be applied to one half of the drive head end surface.

Unlike the pin assemblies described above with reference to FIGS. 1–9, the pin assemblies of this embodiment have different notch ends 514*b*. The first pin assembly 512*a* has a U-shaped notch, designated generally as reference numeral 515, formed in the notch end 514*b* of the bar 514. The U-shaped notch 515*a* is defined by two axial notch surfaces 515*a* and a radial notch surface 515*b*. The second pin assembly 512*b* has a tab 519 protruding longitudinally outwardly from the notch end 514*b* of the bar 514. The tab 519 preferably has a rectangular cross section and extends about ¾ inches from the notch end surface 514*b*. The tab 519 is designed to cooperatively engage with the U-shaped notch 515 so that a turning force from one shaft segment 531*a* can be transmitted to an adjacent shaft segment 531*b*. The tab is also designed to disengage from the U-shaped notch under load when the bars are rotated 90 degrees.

A pair of pin assemblies 512 is shown in FIGS. 18 and 19 in cooperating engagement with one another to connect during rotation two recessed bolt circle type couplings 531*a* and 531*b*. The connection is provided by inserting one pin assembly into each of a pair of aligned, opposed coupling bolt holes until the tab 519 and the U-shaped notch 515 overlap. As the first coupling 531*a* is rotated, in the direction shown in FIG. 18, the tab from the first pin assembly 512*b* contacts one of the axial surfaces 515*a* of the U-shaped notch 515 of the second pin assembly 512*b*, thereby causing the couplings 531*a* and 531*b* to rotate together as a unit. In contrast with the first embodiment described above with reference to FIGS. 1–9, the U-shaped notch 515 and tab 519 connects the couplings 531 for rotation in either the clockwise or counterclockwise direction.

A pair of pin assemblies 512 is shown in FIGS. 20 and 21 disengaged from one another, for example at the end of the rotation phase of a coupling alignment check, on the same two recessed bolt circle type couplings 531*a* shown in FIGS. 18 and 19. The couplings are disconnected by rotating each pin assembly 90 degrees within the bolt holes, thereby causing the previously engaged axial notch surfaces 515*a* to be separated by a gap 523 and change their angular orientation relative to the direction of rotation of the couplings. In FIGS. 20 and 21, the direction of rotation of the couplings is in the "Z" direction or perpendicular to the plane of the drawing sheet. The disengagement notch gaps 523 result from the fact that the thickness "X" of the tab 519 shown in FIG. 21 is less than the distance between axial surfaces 515*a* of U-notch 515, preferably by ⅛ inches nominal, and because the coupling bolt holes have bolt hole circle diameters that are nearly concentric.

The pin assemblies 512 are rotated by applying a wrench or other torquing tool to the drive head 517 and simultaneously rotating both pin assemblies 90 degrees. The pin assemblies may be turned either clockwise or counterclockwise so long as both pins are turned in the same direction. The pin assemblies 512 can be turned very easily since turning resistance is minimal due to the slip fit of the bronze sleeve 516 and the bolt hole inner surface which act together like a shaft and bearing.

Figure 22:
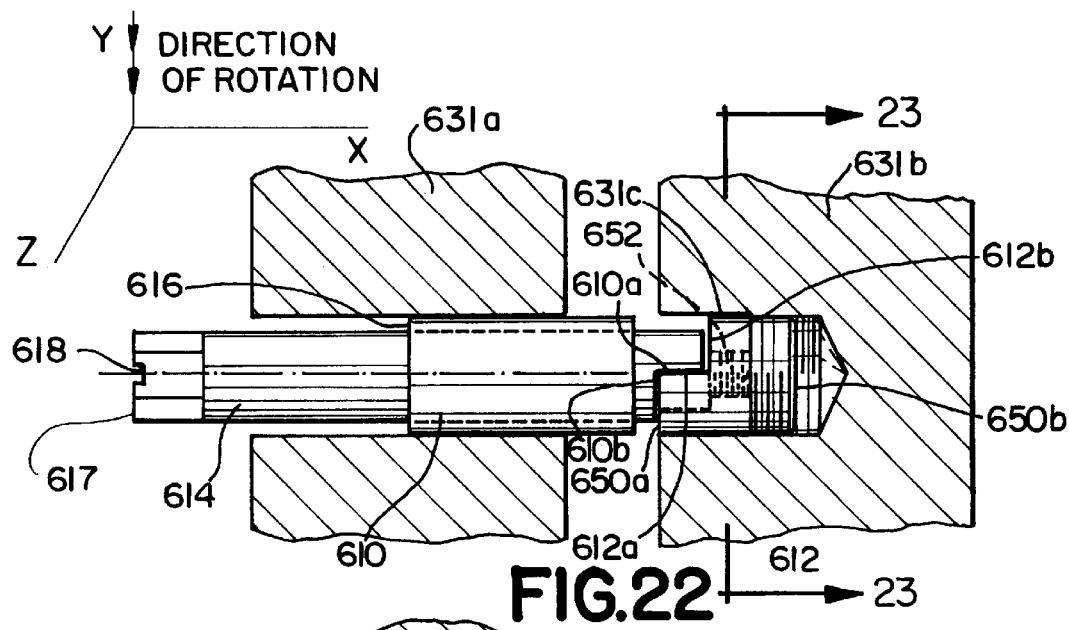
FIG. 22 is a side elevational view of two couplings (shown in cross section) connected by a pin assembly of an additional embodiment of the invention.
Figure 23:
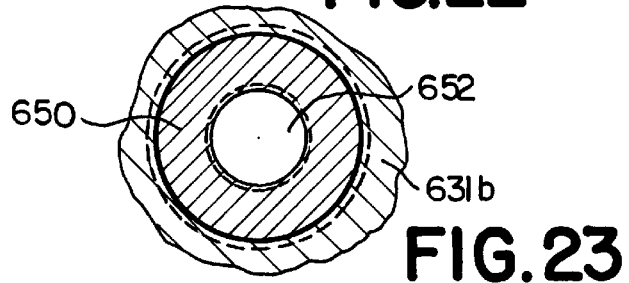
FIG. 23 is a cross-sectional view taken along line 23—23 of FIG. 22.

A seventh embodiment of the coupling pin device of the present invention comprises a pair of cooperating pin assemblies 610, 612 as illustrated in FIGS. 22–23. This embodiment is especially useful when one of the mating couplings 631b does not have a through hole which traverses the entire width of the coupling as illustrated in FIG. 22. In such a case, the above-described pin assemblies are not practical.

In this embodiment of the invention, the coupling pin device comprises a pair of cooperating pin assemblies 610 and 612. The first pin assembly 610 has substantially the same construction as the pin assembly described above with respect to FIGS. 1–9. The first pin assembly 610 comprises a steel bar 614 and a bronze, brass, or other soft metal sleeve 616 heated and shrunk fit over the annular, axially extending outer surface of the bar 614 so as to join the bar 614 and sleeve 616 together.

The bar 614 has two end surfaces 614b, 614c. A notch is formed in the notch end 614b of the bar 614. The notch is defined by an axial notch surface 610a and a radial notch surface 610b.

The axial notch surface 610a is formed, preferably by machining, longitudinally into the bar from the notch end 614b of the bar 164. The axial notch surface 610a preferably extends longitudinally about 1 inch nominal, and forms a planar surface parallel to the longitudinal axis of the bar 614.

The radial notch surface 610b is formed, preferably by machining, radially into the bar from the outer annular surface of the bar 614 and intersects the axial notch surface 610a, thereby forming the notch. The radial notch surface extends radially from the axial notch surface 610a to the annular outer surface in a direction transverse, and preferably perpendicular, to the axial surface 610a and the longitudinal axis of the bar 614.

The bar 614 has a drive head 617 formed therein, preferably by machining, at the drive end 614c so that the bar 614 can be rotated with a standard wrench (not shown). Referring to FIG. 22, the drive head 617 is depicted as a hex head in a preferred embodiment, but may be a square-end head, twelve-point head, or any other geometric shape head which facilitates easy turning with a standard wrench, socket wrench, or other torquing tool.

A notch locator slot 618 may be formed in the end surface of the hex drive 617. The notch locator slot 618 preferably comprises a linear groove machined parallel to the axial notch surface 610a. The notch locator slot 618 is used as an easy reference to determine the angular orientation of the axial notch surface 610a. To also aid referencing the angular orientation of the axial notch surface 610a, paint may be applied to one half of the drive head end surface.

The second pin assembly 612 comprises a bar 650 which is much shorter in comparison to the first bar 614. The second bar 650 has two end surfaces 650a, 650b. A notch is formed in the first end surface 650a of the bar 650. The notch is defined by an axial notch surface 612a and a radial notch surface 612b. The notch surfaces have substantially the same shape and dimensions as the notch surfaces 610a, 610b of the first bar 614.

The annular outer surface of the second bar 650 is short and stays within the counterbore 631c of the threaded bore of the second coupling 631b. The second bar also has a threaded, longitudinally-extending, through hole 652 which extends from one end surface 650a to the other end surface 650b. The through hole 652 is used to insert the second bar 650 in the counterbored section of the threaded bore of the second coupling 631b.

A pair of pin assemblies 612 is shown in FIGS. 22 and 23 in cooperating engagement with one another to connect during rotation two couplings 631a and 631b. The connection is provided by first inserting the second pin assembly 612 through the bolt hole of the first coupling 631a, and then inserting the second pin assembly 612 into the bore of the second coupling 631b. The second pin assembly is installed using a threaded rod (not shown) which is screwed into the through hole 652 of the second bar 650. Next, the first pin assembly 610 is inserted into the bolt hole of the first coupling 631a until the axial notch faces 610a, 612a of the bars overlap.

As the first coupling 631a is rotated in the direction shown in FIG. 22, the axial notch face 610a of the first bar 614 contacts the axial notch face 612a of the second bar 650, thereby causing the couplings 631a and 631b to rotate together as a unit. The couplings 631 are disconnected by rotating the first pin assembly 90 degrees within the bolt hole, thereby causing the previously engaged axial notch surfaces to be separated by a gap and change their angular orientation relative to the direction of rotation of the couplings.

In the method of the present invention, the coupling pin devices described above with reference to FIGS. 1–14 and 18–23 are preferably used during coupling alignment checks. The pin devices temporarily couple together two adjacent shaft segments during the rotational phase and quickly uncouple the shaft segments during the measurement phase.

In accordance with this method, the connection bolts connecting a pair of turbine coupling collars are first removed so that the shaft segments may be removed and inspected. After the connection bolts are removed but prior to shaft removal, the turbine shaft alignment at each coupling is measured as a reference against which the alignment will be compared when the shaft is reassembled. To conduct a coupling alignment check using one of the coupling alignment devices of the present invention, one pin assembly of the coupling alignment device is inserted into each of a pair of aligned, opposed coupling bolt holes until the axial notch faces of the pin assemblies overlap. The axial notch faces are oriented such that the notch faces contact one another and cause the couplings to rotate together as a unit.

After each rotational phase of the coupling alignment check, the pin assemblies are rotated 90 degrees within the bolt holes, thereby causing the previously engaged axial notch surfaces to be separated by a disengagement gap and change their angular orientation relative to the direction of rotation of the couplings. The alignment between each coupling can then be measured in a stress-free condition. Before the next rotational phase, the pin assemblies are rotated 90 degrees within the bolt holes back to the engaged orientation. This procedure is repeated until the predetermined number of alignment measurements has been achieved.

Figure 24:
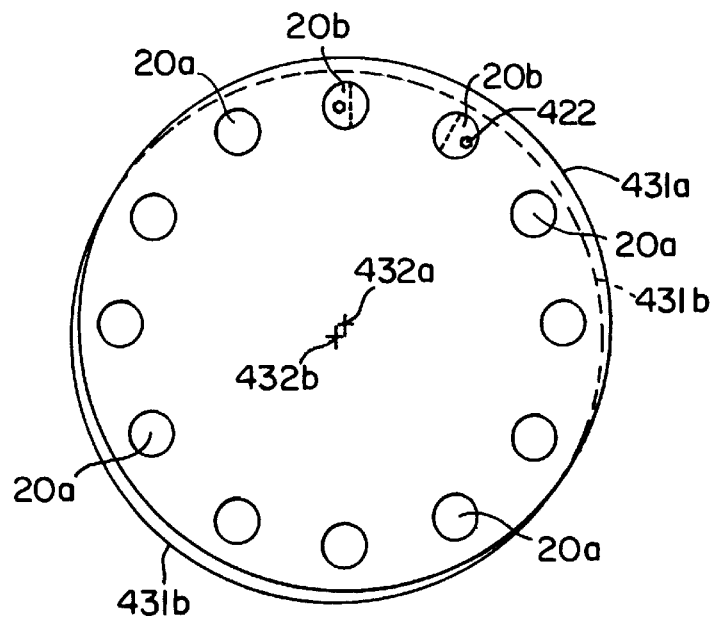
FIG. 24 is a schematic illustration of the differential coupling runout of two couplings which is corrected in accordance with a method of the present invention.

In the method in accordance with another embodiment of the invention, the coupling pin device described above with reference to FIGS. 17–19, is preferably used to correct coupling collar concentricity or "coupling runout". The above-described coupling runout eliminator (CRE) pin devices can be used to precisely adjust the concentric alignment of, for example, the turbine end (TE) and the generator end (GE) coupling halves to each other during initial coupling assembly or reassembly in order to eliminate differential coupling runout (DCR). The method according to this embodiment of the invention is described with reference to FIGS. 24–26. The DCR between the TE coupling and GE coupling is illustrated in exaggerated proportion in FIG. 24 wherein reference numeral 431a designates the TE coupling and reference numeral 431b represents the GE coupling half. In FIG. 24, the center of the TE coupling is designated by reference numeral 432a while the center of the GE coupling is designated by reference numeral 432b.

To correct DCR using the method of the present invention, the TE and GE rotor coupling collars are initially lined up for assembly using matched markings provided on the couplings. Four (4) temporary bolts are installed in equally spaced hole locations such as at the holes designated by reference numeral 20a. Preferably, the temporary bolts are permanent hydraulic bolts without sleeves so that the bolts have a ⅟₃₂ inch clearance (minimum) in the holes. The temporary bolts are tightened sufficiently to draw the couplings close together but not so tight that the coupling faces are securely clamped together.

Figure 25:
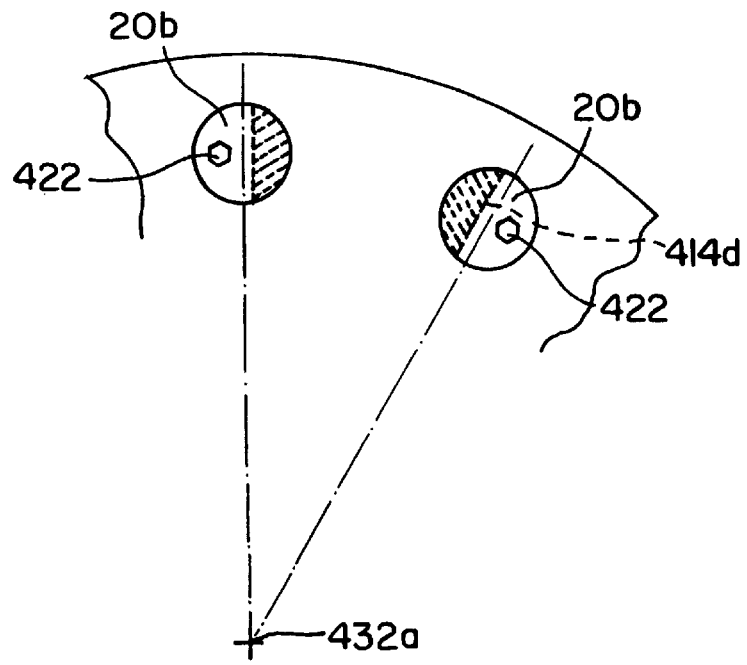
FIG. 25 is an enlarged, sectional view of FIG. 24 showing the angular location and orientation of two pin assemblies used in accordance with a method of the present invention.

Aligned clock position between the mating coupling bolt holes is then established by installing two CRE pin devices in adjacent holes such as, for example, holes 20b in FIGS. 24 and 25. The axial notch faces 415a are oriented as shown in FIG. 25 such that the length of the notch corner 414d is parallel to a radial line extending from the center 432a of the TE coupling 431a through the center of the bolt hole 20b. Aligned clock position between mating coupling holes is achieved by rotating the adjustment bolts 422 either clockwise or counterclockwise to wedge or scissor the couplings relative to one another. The rotor attached to the coupling is rotating a slight amount in order to accommodate scissoring movement.

After aligned clock position is achieved between the mating coupling bolt holes 20, the temporary bolts are tightened enough to close up the gap between the TE and GE couplings and to hold the couplings firmly together during rotation. When all 4 temporary bolts are tightened, the two CRE pin assemblies are removed.

A second method of aligning clock position is to use normal bolting, either hydraulic or body bound bolts, to draw up and hold the couplings firmly together. These tight fitting bolts must be removed prior to adjusting the concentricity with the pin assemblies.

An initial DCR check is performed by rotating the shaft and taking an alignment (runout) reading every 45 degrees. The location of maximum positive differential coupling runout (DCR) of the TE coupling with respect to the GE coupling is marked with an appropriate indicator such as the letter "H". This angular location is hereinafter referred to as the H-position.

Figure 26:
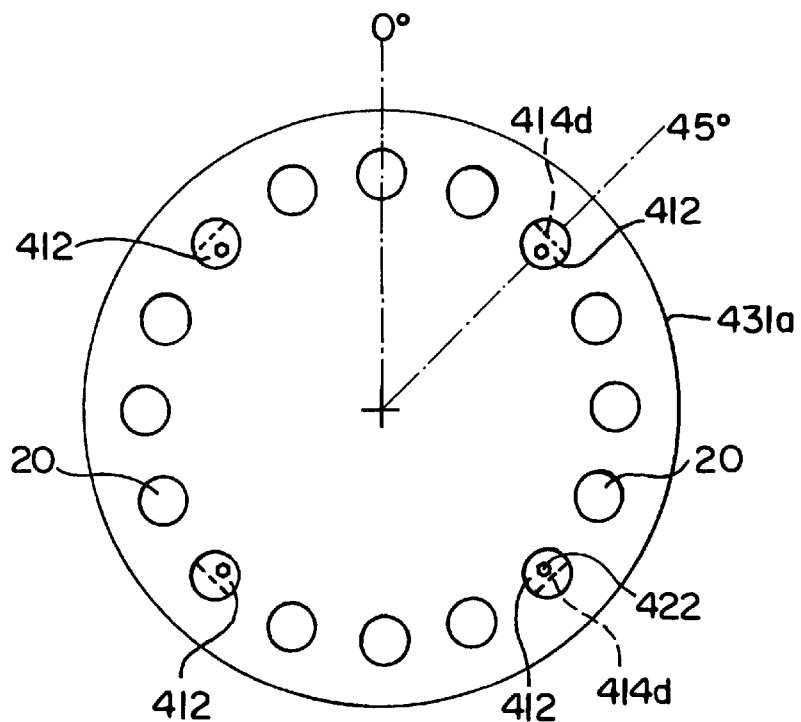
FIG. 26 is a schematic illustration of the location of pin assemblies used in accordance with a method of the present invention.

The shaft segments are then rotated such that the H-position is located 45 degrees clockwise from top dead center as shown in FIG. 26. The amount of differential runout which exists at the H-position, 135, 225, and 315 degree positions is measured and recorded. A positive value is assigned to the DCR value when the runout of the GE coupling is greater than the runout of the TE coupling. A negative value is assigned to the DCR value when the runout of the GE coupling is less than the runout of the TE coupling. At this point, if the coupling spacer is not concentric, install spacer alignment brackets (SAB) 90 degrees apart around the circumference of the coupling to correct the alignment of the spacer. Set up four (4) separate mag base dial indicators to assist.

Next, install four (4) CRE pin assemblies 412 at 45, 135, 225, and 315 degrees from top dead center as shown in FIG. 26. Orient the CRE pin assemblies 412 such that the length of the notch corner 414d is perpendicular to a radial line extending from the center 432a of the TE coupling 431a through the center of the bolt hole 20. Further, the adjustment bolts 422 should be located in between the center 432a of the coupling 431a and the axial notch surface 415a. Hand tighten the CRE pin assemblies so that the axial wedge surfaces of the pins make contact.

Set up four (4) separate mag base dial indicators at the 45, 135, 225, and 315 degree locations. The mag base should preferably be on the TE coupling while the dial button should preferably be on the GE coupling. Set each indicator to ½ of the value of DCR recorded for those locations.

Loosen the temporary bolts enough so that the couplings may be jacked or scissored relative to one another. Adjust the CRE pin assemblies until the runout of the couplings is eliminated. Starting at the H-position, rotate the adjustment bolt 422 on that CRE pin assembly until the H-position adjacent that indicator reads zero. Adjust the other three CRE pin assemblies until their adjacent indicators read zero. If, at this point, spacer runout correction is also needed, then slightly loosen the spacer attachment bolts and adjust spacer using the SABs and dial indicators. Re-tighten the four (4) temporary bolts to clamp the couplings firmly together. Monitor the CRE dial indicators during the tightening process. Verify that the indicators still read zero. If necessary, adjust the CRE pin assemblies as needed to maintain couplings in the desired axially aligned position during the tightening process. Repeat DCR check by rotating shafting and taking an alignment (runout) reading every 45 degrees.

At this point, the couplings are concentric and may be line bored. Install four (4) permanent bolts with hydraulic sleeves or fitted bolts (non-hydraulic) on the couplings and then remove the CRE pin assemblies. The CRE pin assemblies may be removed by pulling them out with all-thread and strongback. Pulling is performed in a conventional manner for pulling a dowel.

What is claimed is:

1. A tool for aligning multiple shaft segments which are coupled together to form a single rotating shaft, said shaft segments having couplings with a plurality of radially-located bolt holes extending there through, said tool comprising an elongate cylindrical bar having:

a) an annular, axially-extending outer surface;

b) rotating means on a first end of said bar;

c) engaging/disengaging means fixed on a second end of said bar;

said bar constructed and arranged to be temporarily inserted through a bolt hole in the collar of the first shaft and partially through an aligned hole in an adjacent coupling of the second shaft, until at least a portion of said engaging/disengaging means is positioned within the bolt hole of the second collar, said engaging/disengaging means constructed and arranged to engage the second collar so that a turning force from the first shaft is transmitted to the second shaft, and constructed and arranged to disengage from the second collar by rotating said bar after rotation of the shafts is ceased.

2. The tool recited in claim 1, said engaging/disengaging means comprising an extension formed on the second end of said bar, said extension having an axially-extending surface and a radially-extending surface at the second end of said bar, said radially-extending surface extending a distance d1 in a first radial direction and extending a distance d2 in a second radial direction perpendicular to the first radial direction, wherein d1 is greater than d2.

3. The tool recited in claim 1, said bar constructed and arranged to disengage from the second collar when the bar is rotated 90° from an engaged position.

4. The tool recited in claim 1, said rotating means comprising a lug fixed to the first end of the bar, said lug having multiple flat surfaces which are constructed and arranged to receive a wrench or socket for applying a turning force.

5. The tool recited in claim 1, said rotating means comprising a female socket formed in the first end of said bar, said socket constructed and arranged to receive a male torquing tool.

6. The tool recited in claim 1, said bar including an indicator on said rotating means for indicating the angular orientation of said engaging/disengaging means.

7. The tool recited in claim 1, said bar including a sleeve on the annular, axially-extending outer surface, said sleeve being shorter than the axial distance between said rotating means and said engaging/disengaging means.

8. Method of aligning multiple shaft segments which are coupled together to form a single rotating shaft, said shaft segments having couplings with a plurality of bolt holes extending there through, comprising the steps of:

a) providing an alignment tool comprising an elongate cylindrical bar having:
  i) an annular axially-extending outer surface;
  ii) rotating means on a first end of said bar; and,
  iii) engaging/disengaging means on a second end of said bar;

b) inserting the tool through a bolt hole in the collar of a first shaft and partially through an aligned bolt hole in an adjacent coupling of a second shaft until at least a portion of said engaging/disengaging means is positioned within the hole of the second collar;

c) temporarily connecting the couplings by engaging the bar with the collar of the second shaft so that the couplings rotate together as a unit;

d) rotating the shaft segments;

e) ceasing rotation of the shaft segments;

f) disconnecting the couplings by disengaging the bar from the collar of the second shaft by rotating the cylindrical bar within the bolt holes; and, g) measuring the coupling alignment of the adjacent shaft segments.

9. The method recited in claim 8, wherein said bar is disengaged by rotating the bar 90° within the bolt holes.

10. The method recited in claim 8, wherein said cylindrical bar is rotated by a torquing tool applied to said rotating means.

* * * * *